July 12, 1960   C. L. C. CHAPMAN ET AL   2,945,080
METHOD OF MAKING BATTERY SEPARATORS
Filed April 19, 1957
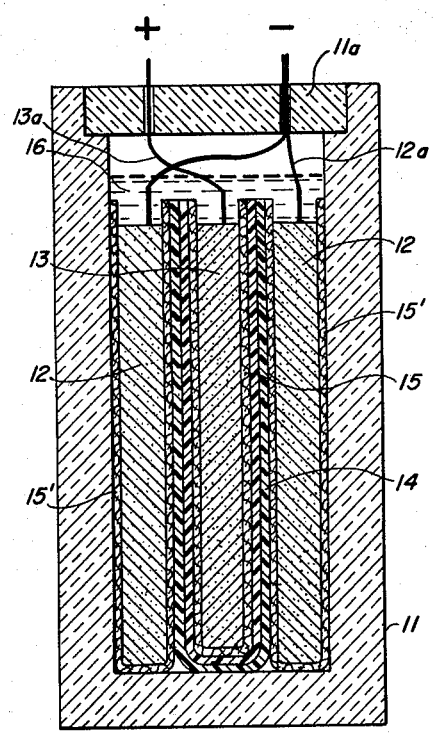
INVENTORS:
CHRISTOPHER L.C. CHAPMAN
ANTONIE HOWARD nee EBER
BY
       AGENT

2,945,080
METHOD OF MAKING BATTERY SEPARATORS

Christopher Lionel Carter Chapman, Sutton, and Antonie Howard, Durham City, England, assignors to Yardney International Corp., New York, N.Y., a corporation of New York Filed Apr. 19, 1957, Ser. No. 653,796

Claims priority, application Great Britain Apr. 19, 1956

3 Claims. (Cl. 136—148)

This invention relates to battery separators and more particularly to separators for alkaline batteries, preferably (but not exclusively) of the rechargeable type.

The invention has for one of its principal objects the preparation of separators of superior properties with regard to tensile strength and chemical resistance.

It is a more specific object of the invention to provide a method of preparing such separators by the impregnation of a carrier with an impregnating solution and then converting the impregnating solution to the desired material in situ.

A principal feature of this invention is the production of battery separators by absorbing solutions of polyvinyl acetate into the body of a carrier and then hydrolyzing the polyvinyl acetate until the electrolytic conductivity of the separator is within the requisite range for use in batteries. Advantageously, the degree of hydrolysis in the final product should be not under 35%.

Another feature of this invention is the use of plasticized solutions and emulsions of polyvinyl acetate, thus permitting the uniform penetration and absorption of the polyvinyl acetate as well as controlling the final physical properties of the hydrolyzed material.

A further and distinctive feature of this invention is the step of performing the hydrolysis of the polyvinyl acetate in the assembled battery by the battery electrolyte.

It has been known for some time that polyvinyl acetate, on account of its high specific electrolytic resistance, is unsuitable for use as a battery separator material. The electrolytic resistance of this material is so high that it is virtually impenetrable to the ions present during the reactions involved in alkaline batteries of the various types including the nickel-cadmium, the silver-cadmium, the nickel-zinc, the mercury-zinc and the silver-zinc systems. We have found that by the process of controlled hydrolysis of absorbed polyvinyl acetate it is possible to obtain a material whose conductivity is satisfactory for use as a battery separator. In one embodiment of this invention a continuous impermeable film of polyvinyl acetate is formed on a permeable carrier of woven fabric by the impregnation or coating with a polyvinyl-acetate emulsion or solution and subsequently drying the impregnated or coated carrier. In another embodiment the film is formed between the fibers of a felted fabric by impregnation, and then the carrier is dried. The dry carrier is then immersed in concentration cells of alkalis (sodium or potassium hydroxide) to hydrolyze the polyvinyl acetate until its resistance is below 0.02 ohm per cm.$^2$. The resultant carrier impregnated or coated with partially or completely hydrolyzed polyvinyl acetate is then semi-permeable and can be incorporated into a cell as a separator.

Suitable supports for coating or impregnating include all the various alkali-resistant pervious fabrics including the cellulosic fabrics such as rayon and cotton goods, the polymeric fabrics such as nylon, Orlon, Acrilan, Dynel, or the inorganic fabrics such as glass wool, felt, or cloth. Moreover, the fabrics used do not necessarily have to be of woven construction but may also be of the matted and felted type.

The polyvinyl acetate may be plasticized with any of the common plasticizers for such material including butyl phthalate, ethyl acetate or methyl acetate. Alternatively, unplasticized polyvinyl acetate may be subjected to heat treatments prior to impregnation; such treatments may include subjecting the unplasticized material to temperatures as high as in the neighborhood of 100° C. if proper spreading of the deposit is to be achieved. A separator according to the invention can be used either alone or in conjunction with other semi-permeable material, such as regenerated cellulose, or in conjunction with highly porous materials, such as paper. The latter may serve as a wick permitting access of the electrolyte over the entire face of the separator.

The sole figure of the accompanying drawing is a representation of a battery incorporating separators according to this invention. A casing 11 is provided with a cover 11a and contains negative electrodes 12 of zinc, positive electrodes 13 of silver peroxide, separators 14 according to this invention and wicks 15. Electrodes 12 and 13 are connected via conductors 12a and 13a to the respective positive and negative terminal posts, not shown. The entire electrode assembly 12 to 15 is submerged below the level of electrolyte 16. In general it is desired to have the hydrolysis take place in alkaline solutions of either sodium or potassium hydroxide. The concentration of these alkalis should be in excess of 10% by weight up to the limit of solubility. This however does not preclude hydrolyzing the films in cells of carbonates or other materials that are alkaline in reaction.

Example I

A commercial polyvinyl-acetate emulsion containing approximately 50% weight of polyvinyl acetate, such as that offered on the market by Celanese Corporation of America under the designation CL202, may be diluted with 10 parts of water. This emulsion is then used as an impregnant for a nylon fabric 0.008 cm. in thickness. The impregnated fabric carrier is then dried, subjected to heat treatment by infrared radiation and then hydrolyzed by being submerged for 36 hours below the surface of a 50% solution of potassium hydroxide. The fabric is then removed, washed free of alkali and dried. When assembled it was found to have specific resistivity in the range of 0.01 ohm per cm.$^2$.

Example II

The procedure of Example I is followed with the exception that the dipped and dried carrier is formed into a battery separator such as element 14 and included in a precharged electrode assembly as shown in the drawing. The electrolyte, an aqueous solution of KOH in concentration greater than 30% is introduced into casing 11. The battery thus formed is allowed to stand for a prolonged period at room temperature until the internal resistance of the battery is found to have fallen to a desired value. This condition will be obtained after approximately 3 hours' standing.

In general it has been found that separator films having a resistivity of less than 0.02 ohm per cm.$^2$ is suitable for use in battery construction. It is, however, readily apparent that the lower the resistivity of the separator the lower will be the apparent internal resistance of the battery.

The heat treatment described in connection with Example I has the dual purpose of promoting hydrolysis and plasticizing or further plasticizing the deposit (coating or impregnant) of polyvinyl acetate. If the material is originally well plasticized, such heat treatment may be omitted.

The process according to the invention enables the formation on a support of very thin films which would not resist preliminary handling, e.g. prior to introduction into the battery, if produced originally from polyvinyl alcohol.

We claim:

1. A method of producing an electrode assembly for electric batteries which comprises the steps of coating a permeable carrier with a film of polyvinyl acetate, forming an electrode assembly by interposing said carrier between electrodes of opposite polarities, immersing said electrode assembly in an alkaline electrolyte and subjecting said assembly to the action of said electrolyte until said film has been hydrolyzed to a degree upwards of approximately 35%.

2. A method of producing an electrode assembly for electric batteries which comprises the steps of coating a permeable carrier with a film of polyvinyl acetate, forming an electrode assembly by interposing said carrier between electrodes of opposite polarities, immersing said electrode assembly and said carrier in an alkaline electrolyte and subjecting said assembly to the action of said electrolyte until the resistance of said carrier has been reduced below a value of substantially 0.02 ohm per cm.$^2$.

3. A method according to claim 2, wherein said electrodes are precharged prior to immersion in said electrolyte.

References Cited in the file of this patent

UNITED STATES PATENTS

| 2,410,225 | Macht et al. | Oct. 29, 1946 |
| 2,436,433 | Jebens | Feb. 24, 1948 |
| 2,635,127 | Yardney | Apr. 14, 1953 |

OTHER REFERENCES

"Vinyl and Related Polymers," by Schildknecht, Wiley and Sons, 1952, pp. 341–344.